(12) United States Patent
Yamasaki

(10) Patent No.: US 10,922,037 B2
(45) Date of Patent: Feb. 16, 2021

(54) MANAGEMENT APPARATUS, MANAGEMENT SYSTEM, AND NON-TRANSITORY COMPUTER READABLE MEDIUM

(71) Applicant: FUJI XEROX CO., LTD., Tokyo (JP)

(72) Inventor: Naoto Yamasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/554,590

(22) Filed: Aug. 28, 2019

(65) Prior Publication Data
US 2020/0278819 A1 Sep. 3, 2020

(30) Foreign Application Priority Data
Feb. 28, 2019 (JP) .................................. 2019-036081

(51) Int. Cl.
*G06F 3/12* (2006.01)

(52) U.S. Cl.
CPC .......... *G06F 3/1262* (2013.01); *G06F 3/1204* (2013.01); *G06F 3/1291* (2013.01)

(58) Field of Classification Search
CPC ............................. G06F 3/1264; G06F 3/1204
See application file for complete search history.

(56) References Cited

U.S. PATENT DOCUMENTS

| 8,368,919 B2* | 2/2013 | Morales ................ G06F 3/1244 358/1.15 |
| 8,384,927 B2 | 2/2013 | Harmon et al. |
| 2007/0236725 A1* | 10/2007 | Harmon ................ G06F 3/1205 358/1.15 |

FOREIGN PATENT DOCUMENTS

JP 5101147 12/2012

* cited by examiner

*Primary Examiner* — Ibrahim Siddo
(74) *Attorney, Agent, or Firm* — JCIPRNET

(57) ABSTRACT

A management apparatus includes a storage unit that, if plural individual processing targets are grouped in accordance with predetermined conditions, stores the predetermined conditions and processing target groups generated by grouping the plural individual processing targets in accordance with the predetermined conditions while associating the predetermined conditions and the processing target groups with each other and a display control unit that, if one of the processing target groups stored in the storage unit is selected, displays another processing target group that shares at least one of the predetermined conditions with the selected processing target group.

13 Claims, 11 Drawing Sheets

FIG. 6

| INDIVIDUAL PRINT JOB ID 601 | PRODUCT NAME 602 | No. OF COPIES 603 | No. OF PAGES 604 | No. OF COLORS (FRONT/BACK) 605 | DIMENSIONS 606 | SHEET TYPE 607 | CUSTOMER ID 608 | OUTPUT APPARATUS 609 |
|---|---|---|---|---|---|---|---|---|
| I910001 | A CLUB | 120 | 290 | 4/0 | 210 × 148 | FINE PAPER A | 408901 | PRINTER A |
| I910002 | B TRAVEL | 50 | 60 | 4/4 | 210 × 148 | FINE PAPER B | 51263 | PRINTER B |
| I910003 | C JOURNAL | 160 | 200 | 4/0 | 210 × 148 | FINE PAPER B | 51263 | PRINTER B |
| I910004 | D REPORT | 40 | 60 | 1/0 | 210 × 148 | FINE PAPER A | 408901 | PRINTER A |
| I910005 | E PROPOSAL | 100 | 50 | 4/0 | 210 × 148 | FINE PAPER A | 408901 | PRINTER A |

GROUPING CONDITION NAME

☐ 710

☑ CUSTOMER ID

☐ No. OF COLORS (FRONT)
 ☐ 0  ☐ 1  ☐ 2  ☐ 3  ☐ 4

☐ No. OF COLORS (BACK)
 ☐ 0  ☐ 1  ☐ 2  ☐ 3  ☐ 4

☑ DIMENSIONS

☑ SHEET TYPE

☑ OUTPUT APPARATUS

[ CANCEL ]  [ OK ]

MANAGEMENT APPARATUS, MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-036081 filed Feb. 28, 2019.

BACKGROUND

(i) Technical Field

The present disclosure relates to a management apparatus, a management system, and a non-transitory computer readable medium.

(ii) Related Art

In Japanese Patent No. 5101147, a method for managing a plurality of print jobs is disclosed. In the method, one or a plurality of print jobs are grouped together in accordance with specified grouping conditions without an operation performed by a user, and the one or plurality of print jobs grouped together are transmitted to a printer.

SUMMARY

Aspects of non-limiting embodiments of the present disclosure relate to a management apparatus, a management system, and a non-transitory computer readable medium capable of, if one of a plurality of processing target groups is selected, presenting other processing target groups, which can be selected as rearrangement targets, including individual processing targets.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a management apparatus including a storage unit that, if a plurality of individual processing targets are grouped in accordance with predetermined conditions, stores the predetermined conditions and processing target groups generated by grouping the plurality of individual processing targets in accordance with the predetermined conditions while associating the predetermined conditions and the processing target groups with each other and a display control unit that, if one of the processing target groups stored in the storage unit is selected, displays another processing target group that shares at least one of the predetermined conditions with the selected processing target group.

BRIEF DESCRIPTION OF THE DRAWINGS

An exemplary embodiment of the present disclosure will be described in detail based on the following figures, wherein:

FIG. 6 illustrates an example of a received individual print job list screen at a time when a plurality of individual print jobs received by a print job reception unit 211 are displayed as a list;

FIG. 7 is a diagram illustrating an example of a grouping condition setting screen;

DETAILED DESCRIPTION

Figure 1:
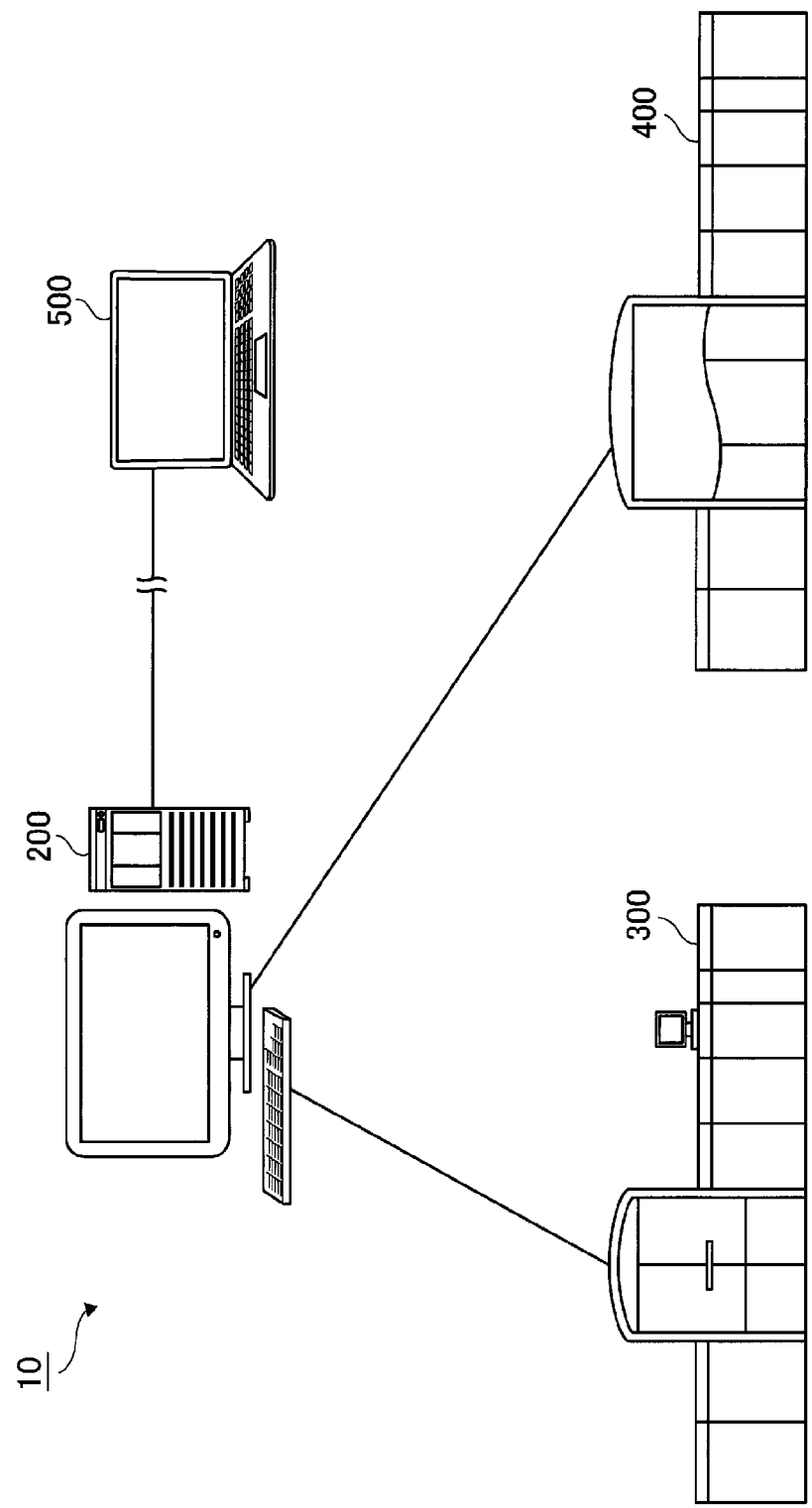
FIG. 1 is a diagram illustrating an example of a printing process management system according to an exemplary embodiment.

A printing process management system 10 according to an exemplary embodiment of the present disclosure will be described with reference to FIG. 1. FIG. 1 is a diagram illustrating an example of the printing process management system 10 according to the exemplary embodiment. As illustrated in FIG. 1, the printing process management system 10 includes a process management server 200, a printer 300, a bookbinder 400, and a client computer 500. The process management server 200, the printer 300, and the bookbinder 400 are connected to one another by the local area network (LAN), and the process management server 200 and the client computer 500 are connected to each other by a LAN or the Internet. Although FIG. 1 illustrates a printer 300, a bookbinder 400, and a client computer 500 for the sake of simplicity, a plurality of printers 300, a plurality of bookbinders 400, and a plurality of client computers 500 may be provided, instead. The bookbinder 400 includes a printer.

The printing process management system 10 according to the present exemplary embodiment groups, using the process management server 200, a plurality of individual print jobs that have been transmitted from the one or plurality of client computers 500 and whose attribute information satisfies the same condition(s), outputs the plurality of individual print jobs to the printer 300 and the bookbinder 400 as group jobs, and performs printing for each group job. That is, "grouping" in the present exemplary embodiment refers to combining together of a plurality of individual print jobs whose attribute information satisfies the same condition(s) as a group collectively subjected to printing. A group job in the present exemplary embodiment is generated by combining together a plurality of individual print jobs whose attribute information satisfies the same condition(s) as a group collectively subjected to printing.

Figure 2:
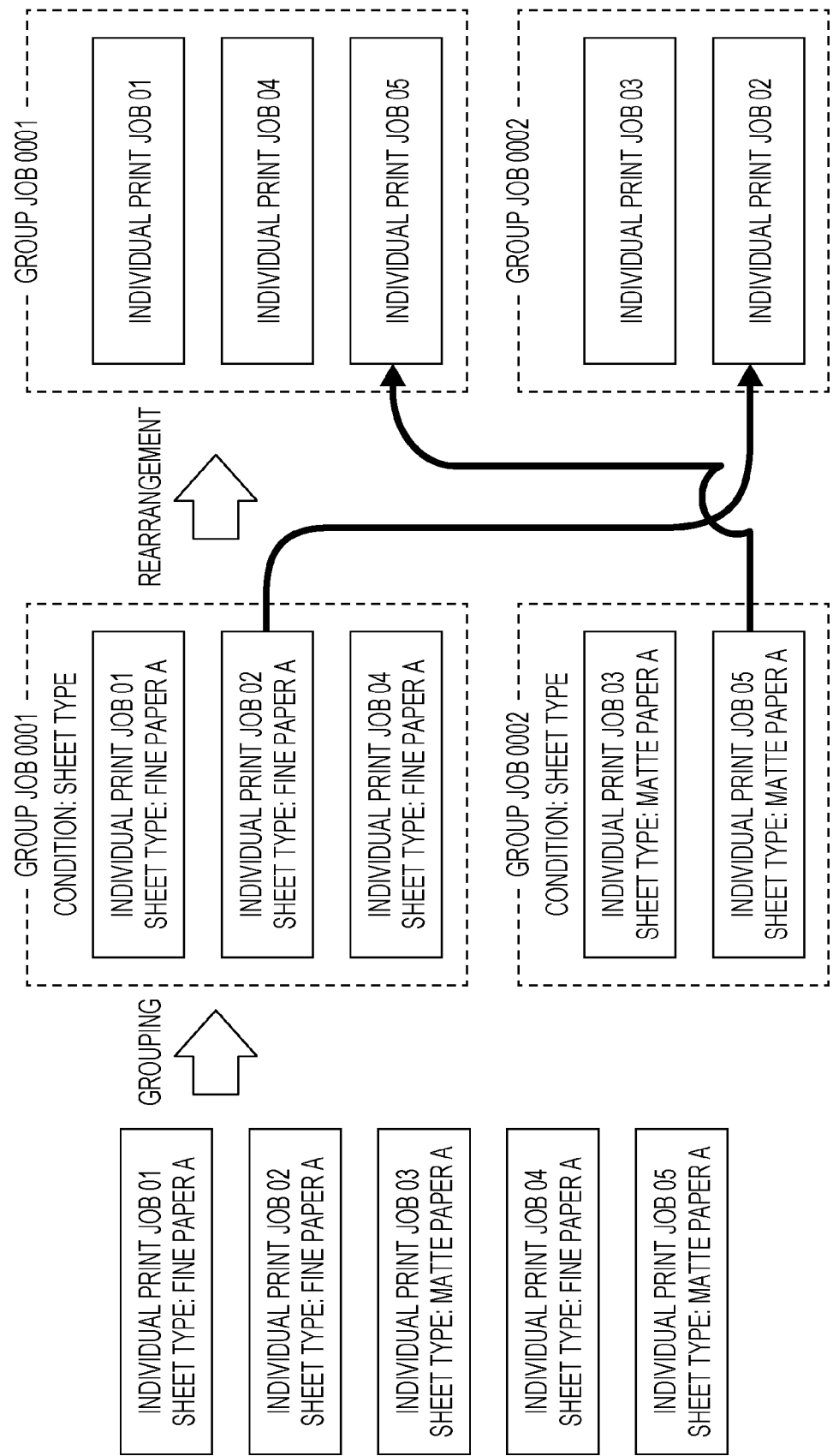
FIG. 2 is a diagram illustrating a concept of group jobs.

FIG. 2 is a diagram illustrating a concept of group jobs. It is assumed in FIG. 2 that there are individual print jobs 01 to 05. These individual print jobs include various pieces of attribute information as well as actual print data and image data. Attribute information is additional information used or referred to when printing is performed, such as customer information, the number of colors, parts information, sheet type, and sheet size. It is assumed, for example, that "sheet type" is set as a grouping condition. Because attribute information regarding the individual print jobs 01, 02, and 04 indicates "fine paper A" as "sheet type", the individual print jobs 01, 02, and 04 are grouped together as a group job 0001. Because attribute information regarding the individual print jobs 03 and 05 indicates "matte paper A" as "sheet type", on the other hand, the individual print jobs 03 and 05 are grouped together as a group job 0002.

When individual print jobs having the same attribute information have been grouped together as a group job and output to the printer 300 and the bookbinder 400, the efficiency of printing improves because a process for changing sheets or an operation for changing sheets need not be performed, compared to when individual print jobs are sequentially output to the printer 300 and the bookbinder 400 and subjected to printing in order of reception.

When a large number of individual print jobs are grouped together as a plurality of group jobs, however, a manager might desire to perform a process for moving individual print jobs in certain group jobs to other group jobs, that is, so-called "rearrangement", for a customer or for himself/herself, or for the sake of the printer 300 or the bookbinder 400. For example, the manager might desire to move the individual print job 02 in the group job 0001 illustrated in FIG. 2 to the group job 0002 and the individual print job 05 in the group job 0002 to the group job 0001.

Figure 3:
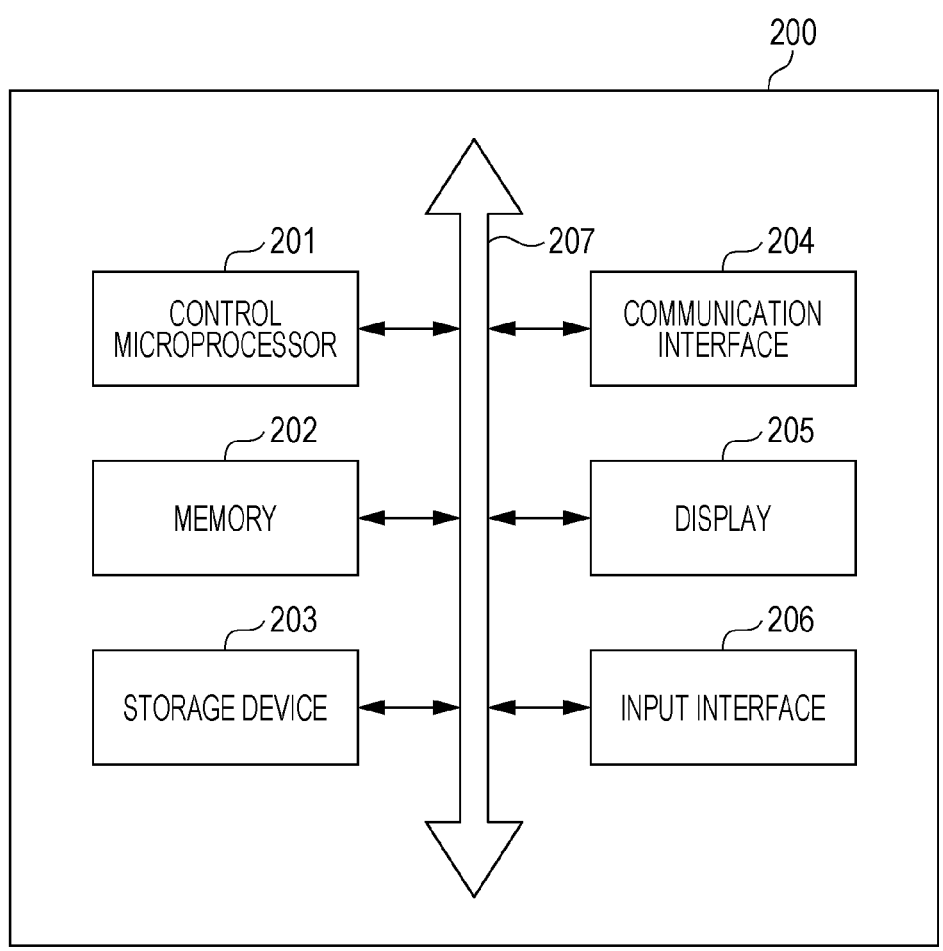
FIG. 3 is a diagram illustrating the hardware configuration of a process management server according to the exemplary embodiment.

The process management server 200, which will be described hereinafter, performs the rearrangement. FIG. 3 is a diagram illustrating the hardware configuration of the process management server 200 according to the present exemplary embodiment. The process management server 200 is a desktop computer, for example, but the present disclosure is not limited to this. The process management server 200 may be a computer of a different type or a terminal apparatus.

As illustrated in FIG. 3, the process management server 200 includes a control microprocessor 201, a memory 202, a storage device 203, a communication interface 204, a display 205, and an input interface 206, all of which are connected to a control bus 207.

The control microprocessor 201 controls the other components of the process management server 200 on the basis of control programs stored in the storage device 203.

The memory 202 temporarily stores data regarding group jobs selected by the manager as group jobs to be rearranged, conditions for retrieving the group jobs to be rearranged, and the like.

The storage device 203 is a hard disk drive or a solid-state drive and stores control programs for controlling the components of the process management server 200. In the storage device 203, data regarding individual print jobs and group jobs generated by grouping the individual print jobs and conditions used to generate the group jobs in the present exemplary embodiment are associated with each other.

The communication interface 204 performs communication control in order to enable the process management server 200 to communicate with the printer 300, the bookbinder 400, and the client computer 500 through the LAN or the Internet.

The display 205 is a liquid crystal display separate from the process management server 200 and displays information to be processed by a display control unit 214, which will be described later. Alternatively, the display 205 may be a display of another computer connected to the process management server 200 by the LAN or the Internet, such as the client computer 500.

The input interface 206 is an input unit that includes a keyboard and a mouse, for example, and used by the manager who operates the process management server 200 to input instructions relating to rearrangement, which will be described later. As with the display 205, the input interface 206 may be an input interface, such as a keyboard and a mouse, of another computer connected to the process management server 200 by the LAN or the Internet, such as the client computer 500.

Figure 4:
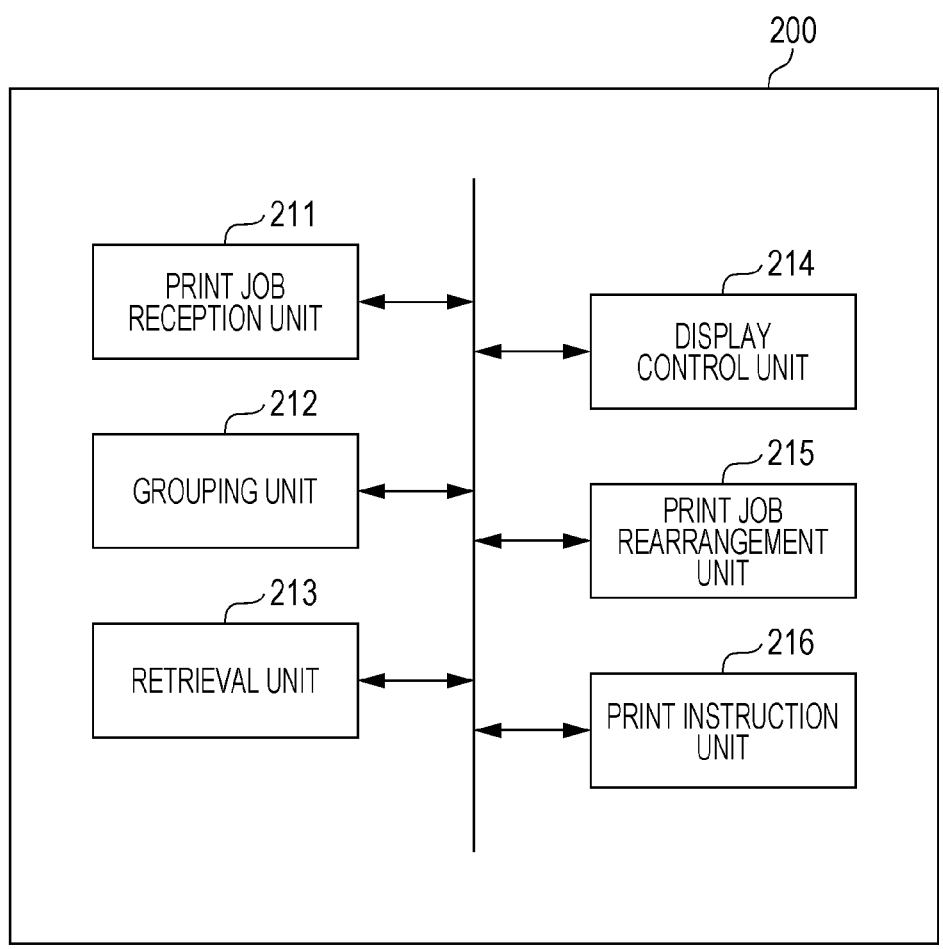
FIG. 4 is a diagram illustrating functional blocks of the process management server illustrated in FIG. 3.

Next, functions of the process management server 200 according to the present exemplary embodiment will be described with reference to FIG. 4. FIG. 4 is a diagram illustrating functional blocks of the process management server 200 illustrated in FIG. 3. As illustrated in FIG. 4, the process management server 200 functions as a print job reception unit 211, a grouping unit 212, a retrieval unit 213, the display control unit 214, a print job rearrangement unit 215, and a print instruction unit 216 by executing the control programs stored in the storage device 203 using the control microprocessor 201.

The print job reception unit 211 sequentially receives a plurality of individual print jobs transmitted from the one or plurality of client computers 500 and stores the individual print jobs in the storage device 203 while giving individual print job identifiers (IDs) to the individual print jobs in order of reception.

The grouping unit 212 groups the individual print jobs stored in the storage device 203 in accordance with predetermined conditions to generate group jobs. The grouping unit 212 then gives group job IDs to the group jobs and stores the group jobs in the storage device 203 while associating the group jobs with the conditions used for the grouping. More specifically, the grouping unit 212 associates individual group jobs belonging to the same group job with the same group job ID and stores the individual print jobs in the storage device 203.

If the manager selects one of the group jobs stored in the storage device 203 as a group job to be rearranged, the retrieval unit 213 retrieves, from the storage device 203, other group jobs that satisfy the same grouping conditions as the selected group job. If retrieval conditions displayed on the display 205 are changed, the retrieval unit 213 retrieves group jobs that satisfy new conditions from the storage device 203. If a condition is added to or removed from the retrieval conditions displayed on the display 205, the retrieval unit 213 retrieves, from the storage device 203, group jobs corresponding to new conditions. The retrieval unit 213 may be configured to retrieve other group jobs that satisfy at least one grouping condition as the selected group job.

If one of the group jobs stored in the storage device 203 is selected as a group job to be rearranged, the display control unit 214 displays, on the display 205, results retrieved by the retrieval unit 213, that is, other group jobs that satisfy the same grouping condition(s) as the selected group job. At this time, the display control unit 214 displays grouping conditions of the selected group job on the display 205. Furthermore, if one of the group jobs displayed as a result of the retrieval is selected, the display control unit 214 displays, on the display 205 in a comparative manner, individual print jobs included in the two selected group jobs, that is, the group job selected by the manager first and the group job selected by the manager from the retrieval results. The display control unit 214 thus establishes a state in which an instruction to move individual print jobs can be received.

If the manager selects individual print jobs in the two selected group jobs as group jobs to be rearranged and moves the individual print jobs between the group jobs, the print job rearrangement unit 215 changes group jobs to which the individual print jobs belong. That is, group job IDs associated with individual print job IDs of the individual print jobs whose group jobs have been changed are changed to group job IDs of group jobs to which the individual print jobs newly belong and stores the individual print jobs in the storage device 203.

The print instruction unit 216 causes the printer 300 and the bookbinder 400 to perform printing according to a specified group job on the basis of an instruction from the manager. More specifically, the print instruction unit 216 transmits individual print jobs belonging to a specified group job to the printer 300 and the bookbinder 400 to cause the printer 300 and the bookbinder 400 to perform printing and bookbinding, respectively.

Figure 5:
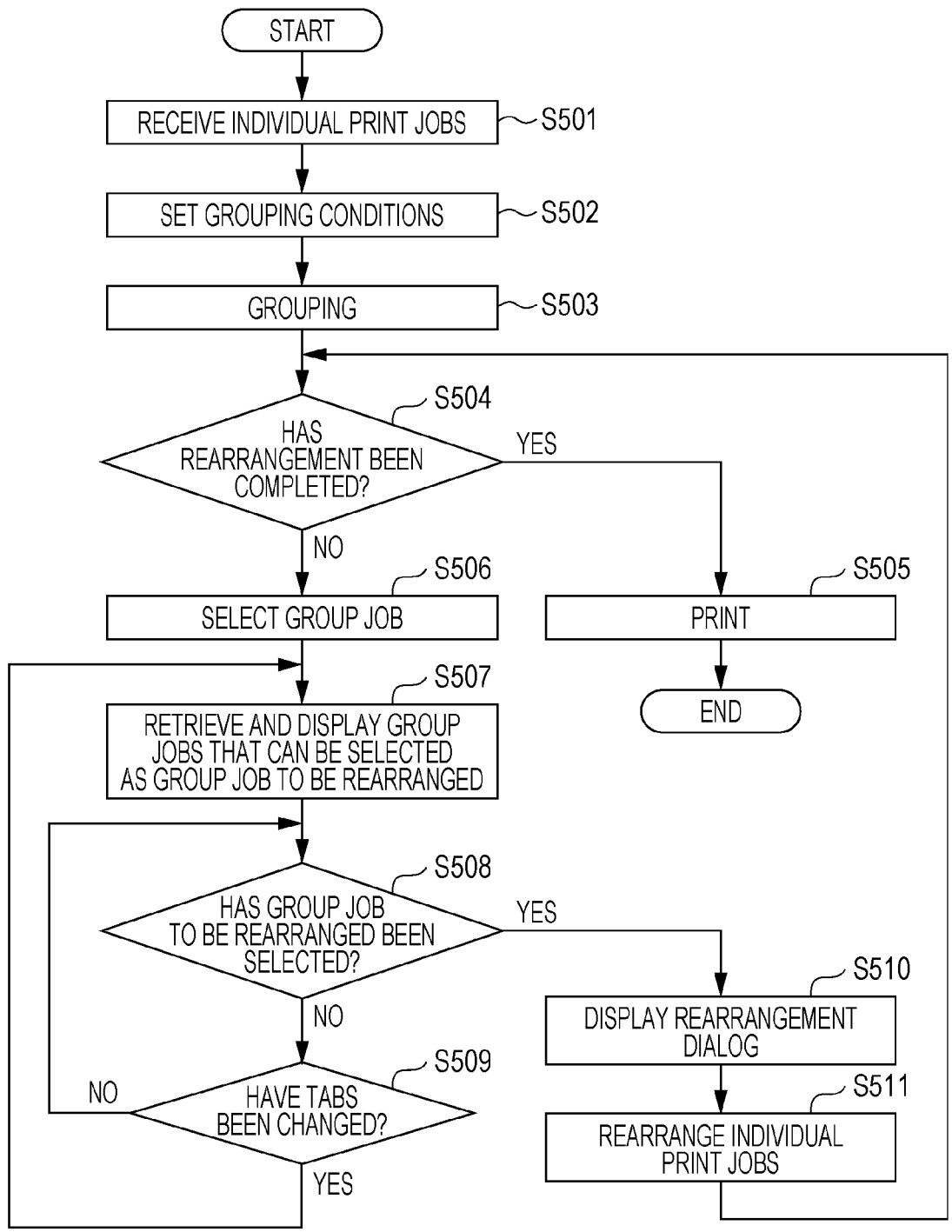
FIG. 5 is a flowchart illustrating a process performed by the process management server according to the exemplary embodiment.

Next, a process for rearranging group jobs performed by the process management server 200 according to the present exemplary embodiment will be described with reference to FIGS. 5 to 11. FIG. 5 is a flowchart illustrating the process performed by the process management server 200 according to the present exemplary embodiment.

In step S501 illustrated in FIG. 5, the print job reception unit 211 of the process management server 200 sequentially receives a plurality of individual print jobs transmitted from the client computer 500 and stores the individual print jobs in the storage device 203 while giving individual print job IDs to the individual print jobs in order of reception. FIG. 6 illustrates an example of a received individual print job list screen 600 at a time when the plurality of individual print jobs received by the print job reception unit 211 are displayed as a list. As illustrated in FIG. 6, the received individual print job list screen 600 includes an individual print job ID field 601, a product name field 602, a number of copies field 603, a number of pages field 604, a number of colors field 605, a dimensions field 606, a sheet type field 607, and a customer ID field 608. A first individual print job 610, for example, is an individual print job received first, and "I910001" is set as an individual print job ID. Attribute information such as a product name "A Club", the number of copies "120", the number of pages "290", the number of colors (front/back) "4/0", dimensions "210×148", a sheet type "fine paper A", a customer ID "408901", and an output apparatus "printer A" is also set.

Each time an individual print job is received, the print job reception unit 211 stores the individual print job in the storage device 203 while giving an individual print job ID to the individual print job ID and associating data regarding the attribute information with the individual print job ID. Each time a predetermined number of individual print jobs are received, or at certain time intervals, or at the request of the manager, the print job reception unit 211 performs the following grouping process. In step S502 illustrated in FIG. 5, the grouping unit 212 generates a screen for setting grouping conditions illustrated in FIG. 7 using the display control unit 214 and displays the screen on the display 205. The manager specifies conditions for grouping individual print jobs while referring to the screen.

FIG. 7 is a diagram illustrating an example of a grouping condition setting screen 700. As illustrated in FIG. 7, the grouping condition setting screen 700 includes a grouping condition name input field 710 and a grouping condition setting field 720. The manager may input any name, such as "condition 1", to the grouping condition name input field 710 for grouping conditions selected thereby. In the grouping condition setting field 720, "customer ID", "No. of colors", "dimensions of sheets", "sheet type", and "output apparatus" are enumerated as grouping conditions, and grouping conditions to be used may be selected by checking checkboxes. If the checkbox for "customer ID" is checked, for example, "customer ID" is selected as a grouping condition. In the subsequent grouping process, individual print jobs having the same customer IDs in attribute information are grouped together to generate group jobs. One or more grouping conditions may be set.

The grouping condition setting field 720 includes a "cancel" button 721 and an "OK" button 722. If the manager selects the "cancel" button 721, setting of grouping conditions is canceled, and the print job reception unit 211 continues to perform step S501, that is, receive individual print jobs. As described above, if the manager selects the "OK" button 722 after setting grouping conditions, on the other hand, the process proceeds to step S503 illustrated in FIG. 5.

In step S503, the grouping unit 212 performs grouping in accordance with the grouping conditions set in step S502 to generate group jobs. Group job IDs are given to the generated group jobs, and the group jobs are stored in the storage device 203 and associated with the grouping conditions.

Figure 8:
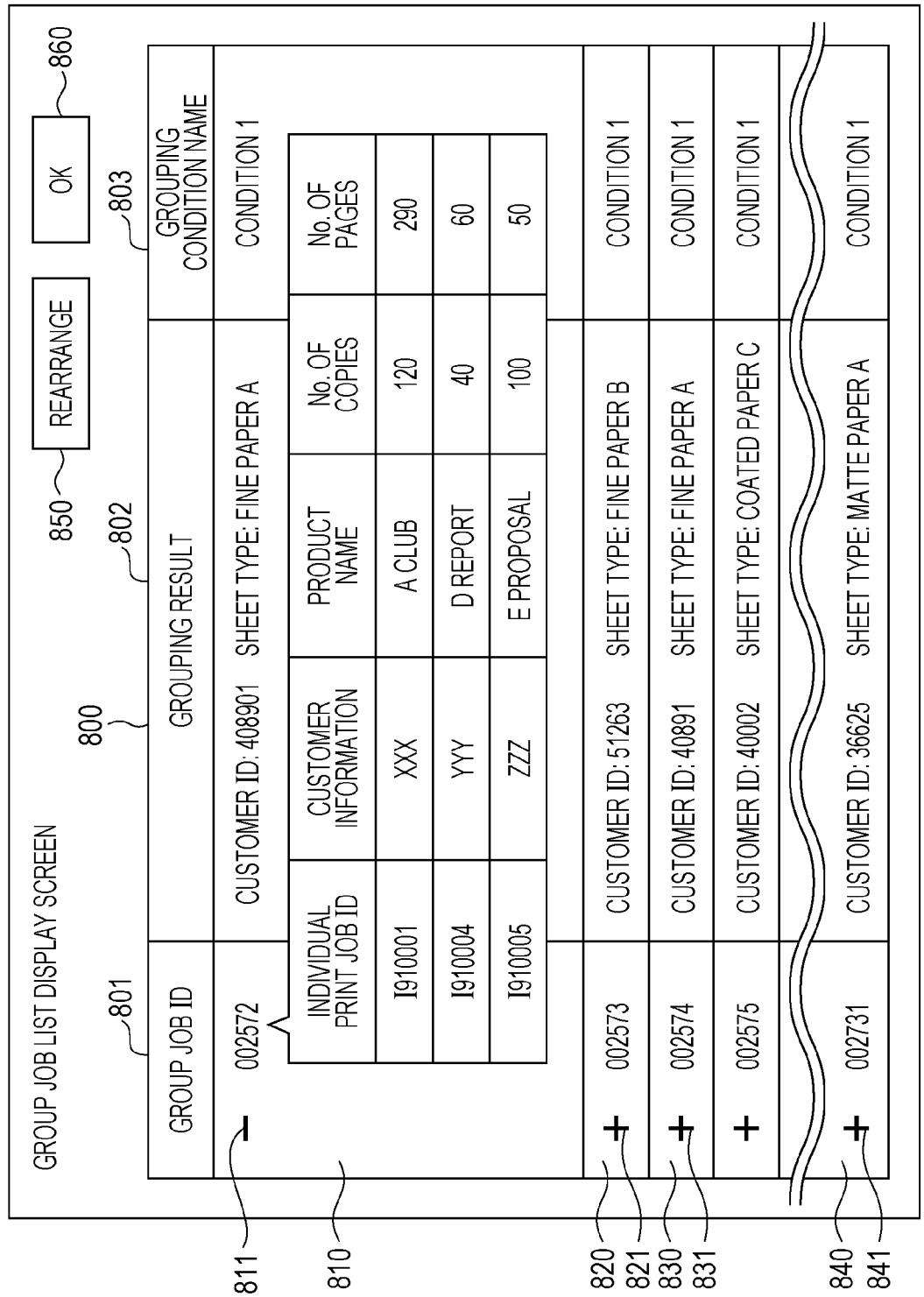
FIG. 8 is a diagram illustrating an example of a group job list screen.

After completing the grouping, the grouping unit 212 displays a group job list screen 800 illustrated in FIG. 8 on the display 205 using the display control unit 214. FIG. 8 is a diagram illustrating an example of the group job list screen 800. The group job list screen 800 includes a group job ID field 801, a grouping result field 802, and a grouping condition name field 803. A plurality of group jobs 810, 820, 830, . . . , and 840 generated as a result of the grouping are displayed on the group job list screen 800 illustrated in FIG. 8 as a list. Group job IDs are given to the group jobs 810 to 840 and displayed in the group job ID field 801. For example, a group job ID "002572" is given to the first group job 810, a group job ID "002573" is given to the second group job 820, a group job ID "002574" is given to the third group job 830, and a group job ID "002731" is given to the last group job 840.

The grouping result field 802 of the group jobs 810 to 840 indicates attributes shared in the group jobs. Here, "customer ID" and "sheet type" have been set as group conditions, for example, "customer ID" and "sheet type" of individual print jobs included in the group job 810 having the group job ID "002572" are "408901" and "fine paper A", respectively. The grouping condition name field 803 of the group jobs 810 to 840 indicates a grouping condition name given at a time of the grouping, namely, for example, "condition 1".

As illustrated in FIG. 8, expand buttons 811, 821, 831, and 841 are provided in the group job ID field 801 of the group jobs 810 to 840, and if the manager selects one of the expand buttons 811, 821, 831, and 841, a list of individual print jobs included in a corresponding group job is displayed. In FIG. 8, the expand button 811 of the group job 810 has been selected, and an individual print job field including a list of individual print jobs included in the group job 810 is displayed. In FIG. 8, for example, three individual print jobs are included in the group job 810, and attribute information regarding each individual print job, such as an individual print job ID, customer information, a product name, the number of copies, and the number of pages, are displayed to the manager. Although the first group job 810 has been expanded in FIG. 8, if the manager selects one of the other expand buttons 821 to 841 for the other group jobs, a corresponding one of the group jobs 820 to 840 is expanded. As a result, a list of individual print jobs included in the group job 820, 830, or 840 is referred to.

The group job list screen 800 illustrated in FIG. 8 includes a "rearrange" button 850 and an "OK" button 860. In step S504 illustrated in FIG. 5, the print job rearrangement unit 215 determines whether the rearrangement has been completed. If the manager selects a group job, namely the group job 810 having the group job ID "0002572", on the group job list screen 800 illustrated in FIG. 8 and selects the "OK" button 860, for example, the print job rearrangement unit 215 determines that the rearrangement of individual print jobs has been completed, and the process proceeds to step S505. The print instruction unit 216 outputs individual print jobs included in the selected group job 810 to the printer 300 and the bookbinder 400 to perform printing and bookbinding, respectively, and ends the process.

If the manager selects the "rearrange" button 850 with a group job selected on the group job list screen 800 in step S504, on the other hand, the print job rearrangement unit 215 determines that the rearrangement has not been completed, and the process proceeds to step S506. In step S506, the print job rearrangement unit 215 temporarily stores the group job selected in FIG. 8 in the memory 202 as a first group job to be rearranged.

Figure 9A:
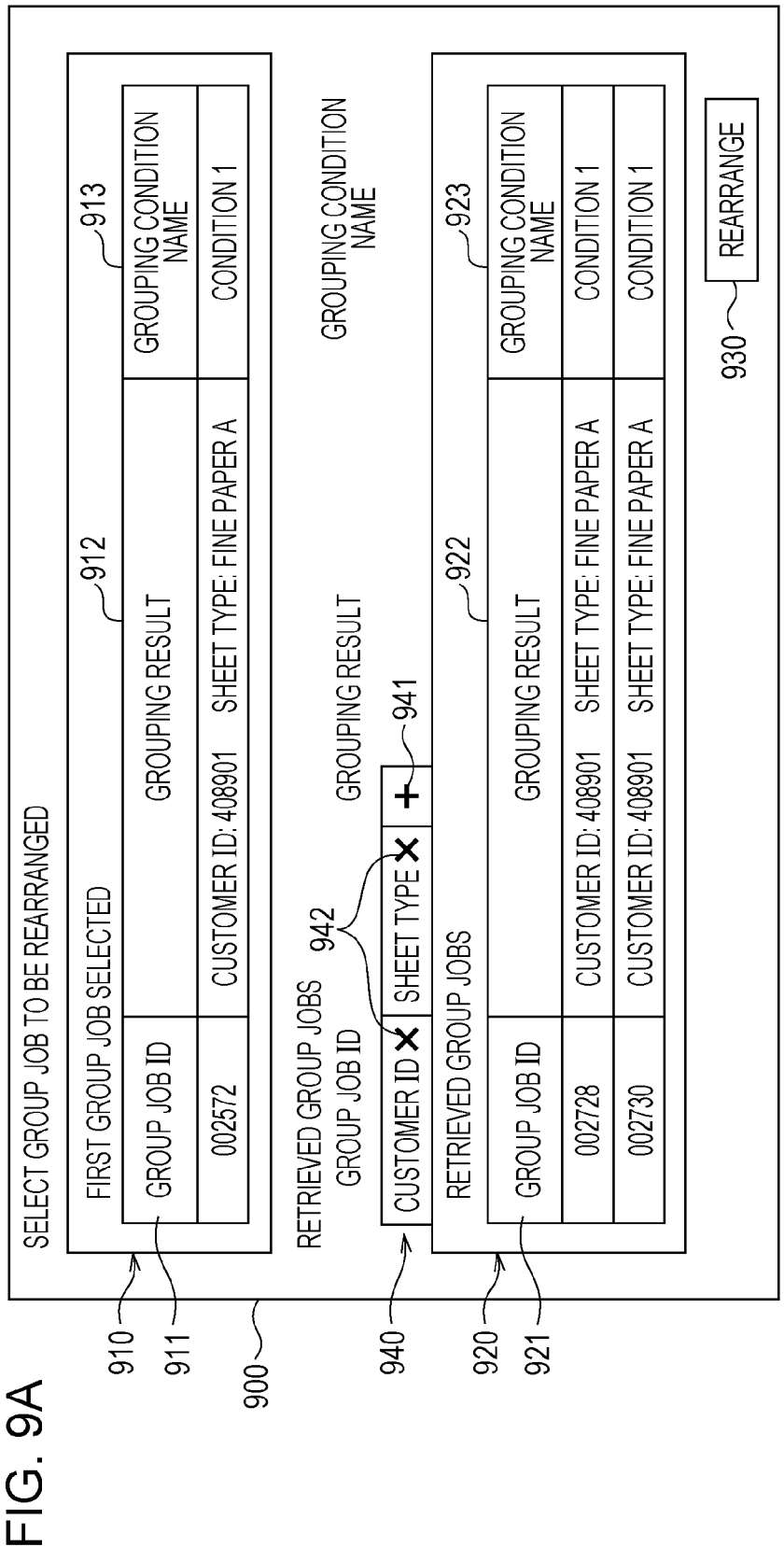
FIG. 9A is a diagram illustrating an example of a retrieval result screen and FIG. 9B is a diagram illustrating a list of addable grouping conditions displayed after a tab addition button is selected in FIG. 9A.

Next, in step S507, the retrieval unit 213 retrieves, from the storage device 203, other group jobs whose attribute information satisfies the same grouping condition(s) as the first group job to be rearranged and displays a retrieval result screen 900 illustrated in FIG. 9A using the display control unit 214. FIG. 9A is a diagram illustrating an example of the retrieval result screen 900.

The retrieval result screen 900 illustrated in FIG. 9A includes a first group job field 910 for displaying the first group job to be rearranged and a retrieval result field 920. The first group job field 910 includes a group job ID field 911, a grouping result field 912, and a grouping condition name field 913 as with the group job list screen 800 illustrated in FIG. 8. In the present exemplary embodiment, the group job having the group job ID "002572" has been selected in step S506. The group job ID "002572" is displayed in the group job ID field 911 and the grouping result field 912 indicates that "customer ID" and "sheet type" are "408901" and "fine paper A", respectively, as in FIG. 8. The grouping condition name field 913 indicates "condition 1", which is a grouping condition name given at the time of the grouping.

The retrieval result field 920 indicates one or more group jobs retrieved by the retrieval unit 213. In FIG. 9A, the retrieval result field 920 indicates two group jobs retrieved by the retrieval unit 213, that is, a group job having a group job ID "0002728" and a group job having a group job ID "0002730", whose attribute information satisfies the same grouping conditions used to perform grouping based on the group job ID "0002572".

The retrieval result field 920 includes a retrieval group job ID field 921, a grouping result field 922, and grouping condition name field 923. The retrieval group job ID field 921 indicates the group job ID "0002728", for example, and the grouping result field 922 indicates the attribute information that has satisfied the conditions used to generate the group job, that is, a customer ID of "408901" and a sheet type of "fine paper A". In FIG. 9A, the attribute information that has satisfied the grouping conditions displayed in the grouping result field 912 of the first group job field 910 and the grouping result field 922 of the retrieval result field 920 is the same or at least partially the same.

The grouping condition name field 923 indicates "condition 1", which is a grouping condition name at a time of the grouping of the group job having the group job ID "0002728".

In step S508 illustrated in FIG. 5, the print job rearrangement unit 215 determines whether a "rearrange" button 930 has been selected with one of the one or more group jobs displayed in the retrieval result field 920 selected by the manager. If the print job rearrangement unit 215 determines that the "rearrange" button 930 has been selected, the process proceeds to step S510 illustrated in FIG. 5. If not, the process proceeds to step S509, and the retrieval unit 213 determines whether grouping conditions of group jobs to be displayed as retrieval results have been changed.

As illustrated in FIG. 9A, the retrieval result field 920 of the retrieval result screen 900 is provided with one or more tabs 940. The tabs 940 correspond to the grouping conditions displayed in the retrieval result field 920. In FIG. 9A, two tabs for "customer ID" and "sheet type" are displayed, and grouping has been performed using these two conditions. If the manager changes the grouping conditions indicated by the tabs 940 by operating the input interface 206, the retrieval unit 213 determines in step S509 that the tabs 940 have been changed, and the process returns to step S508. The retrieval unit 213 retrieves, from the storage device 203, group jobs generated using new grouping conditions and displays the group jobs in the retrieval result field 920 using the display control unit 214.

Figure 9B:
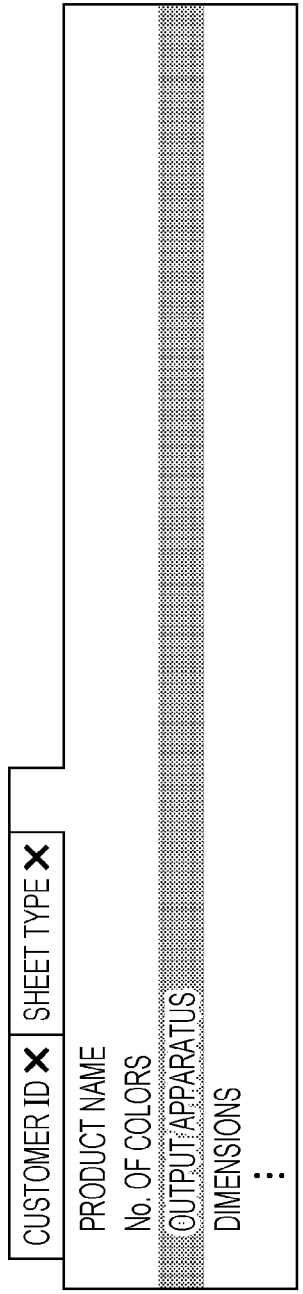

If the manager selects a tab addition button 941 displayed to the right of the tabs 940, for example, a list of grouping conditions that can be added as a tab is displayed as illustrated in FIG. 9B. If the manager selects one of the grouping conditions on the list, the grouping condition is displayed as a new tab. The retrieval unit 213 also retrieves, from the storage device 203, group jobs generated using the added grouping condition and displays the group jobs in the retrieval result field 920 using the display control unit 214. When a plurality of group jobs are displayed in the retrieval result field 920, group jobs to be displayed can be narrowed down since the number of grouping conditions has been increased.

If the manager selects a removal button 942 of one of the tabs 940 that have already been displayed to remove the tab 940, on the other hand, the retrieval unit 213 retrieves, from the storage device 203, group jobs including a remaining grouping condition and displays the group jobs in the retrieval result field 920 using the display control unit 214 in step S507 illustrated in FIG. 5. When a grouping condition is removed, the number of group jobs displayed as retrieval results increases.

Figure 10:
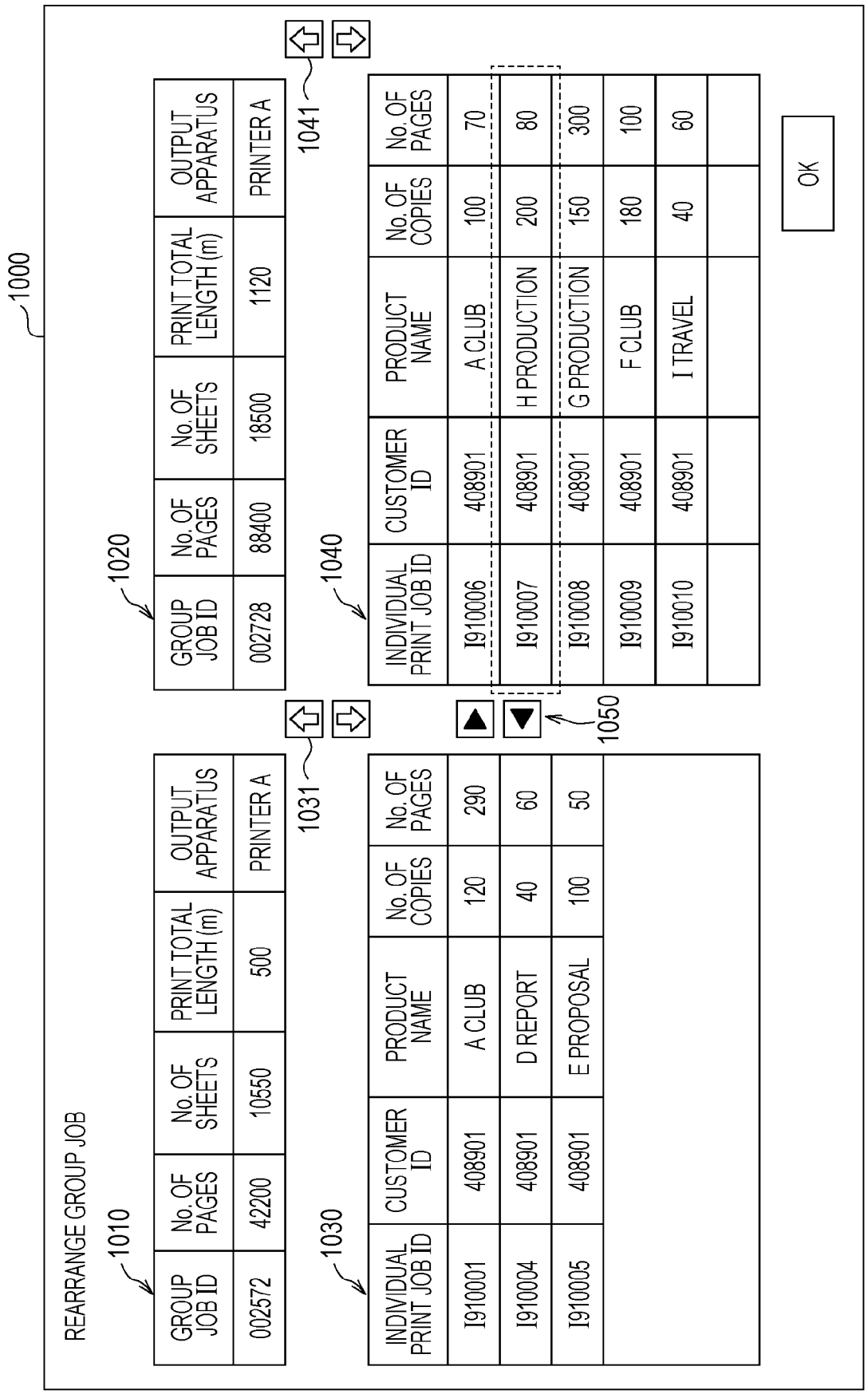
FIG. 10 is a diagram illustrating an example of a rearrangement dialog.

As described above, if the manager selects the "rearrange" button 940 with one of the one or more group jobs displayed in the retrieval result field 920 selected as a second group job, the process proceeds to step S510 illustrated in FIG. 5. In step S510, the print job rearrangement unit 215 displays a rearrangement dialog 1000 illustrated in FIG. 10 on the display 205 using the display control unit 214. FIG. 10 is a diagram illustrating an example of the rearrangement dialog 1000.

As illustrated in FIG. 10, in the rearrangement dialog 1000, individual print jobs included in the first group job selected in step S506 as a group job to be rearranged and individual print jobs included the second group job selected in step S508 as another group job to be rearranged are displayed in a comparative manner. The rearrangement dialog 1000 includes a first group job outline display part 1010, a second group job outline display part 1020, a first individual print job list display part 1030, and a second individual print job list display part 1040.

In the first group job outline display part 1010, "group job ID", "No. of pages", "No. of sheets", "print total length", which indicates the length of sheet used, and "output apparatus" are displayed as outline information regarding the first group job. Similarly, in the second group job outline display part 1020, "group job ID", "No. of pages", "No. of sheets", "print total length", which indicates the length of sheet used, and "output apparatus" are displayed as outline information regarding the second group job.

In the first individual print job list display part 1030, a list of individual print jobs included in the first group job is displayed. Similarly, in the second individual print job list display part 1040, a list of individual print jobs included in the second group job is displayed.

Move buttons 1031 are provided for the first individual print job list display part 1030. If the manager selects one of the move buttons 1031 with an individual print job displayed in the first individual print job list display part selected, the selected individual print job moves upward or downward in the first individual print job list display part 1030. Similarly, move buttons 1041 are provided for the second individual print job list display part 1040. If the manager selects one of the move buttons 1041, an individual print job moves upward or downward in the second individual print job list display part 1040.

A rearrange button 1050 is provided for the rearrangement dialog 1000 illustrated in FIG. 10. If the manager selects the rearrange button 1050 with one of the individual print jobs displayed in the first individual print job list display part 1030 selected, the print job rearrangement unit 215 moves, in step S511, the selected individual print job that belongs to the first group job to the second group job, that is, performs rearrangement. The individual print job moved from the first group job to the second group job is displayed at a bottom of the second individual print job list display part 1040.

If the manager selects the rearrange button 1050 with one of the individual print jobs displayed in the second individual print job list display part 1040 selected, on the other hand, the print job rearrangement unit 215 moves, in step S509, the selected individual print job that belongs to the second group job to the first group job, that is, performs rearrangement. As in the above case, the individual print job moved from the second group job to the first group job is displayed at a bottom of the first individual print job list display part 1030. In FIG. 10, a second individual print job in the second individual print job list display part 1040, that is, an individual print job having an individual print job ID "I910007", has been selected for rearrangement.

Figure 11:
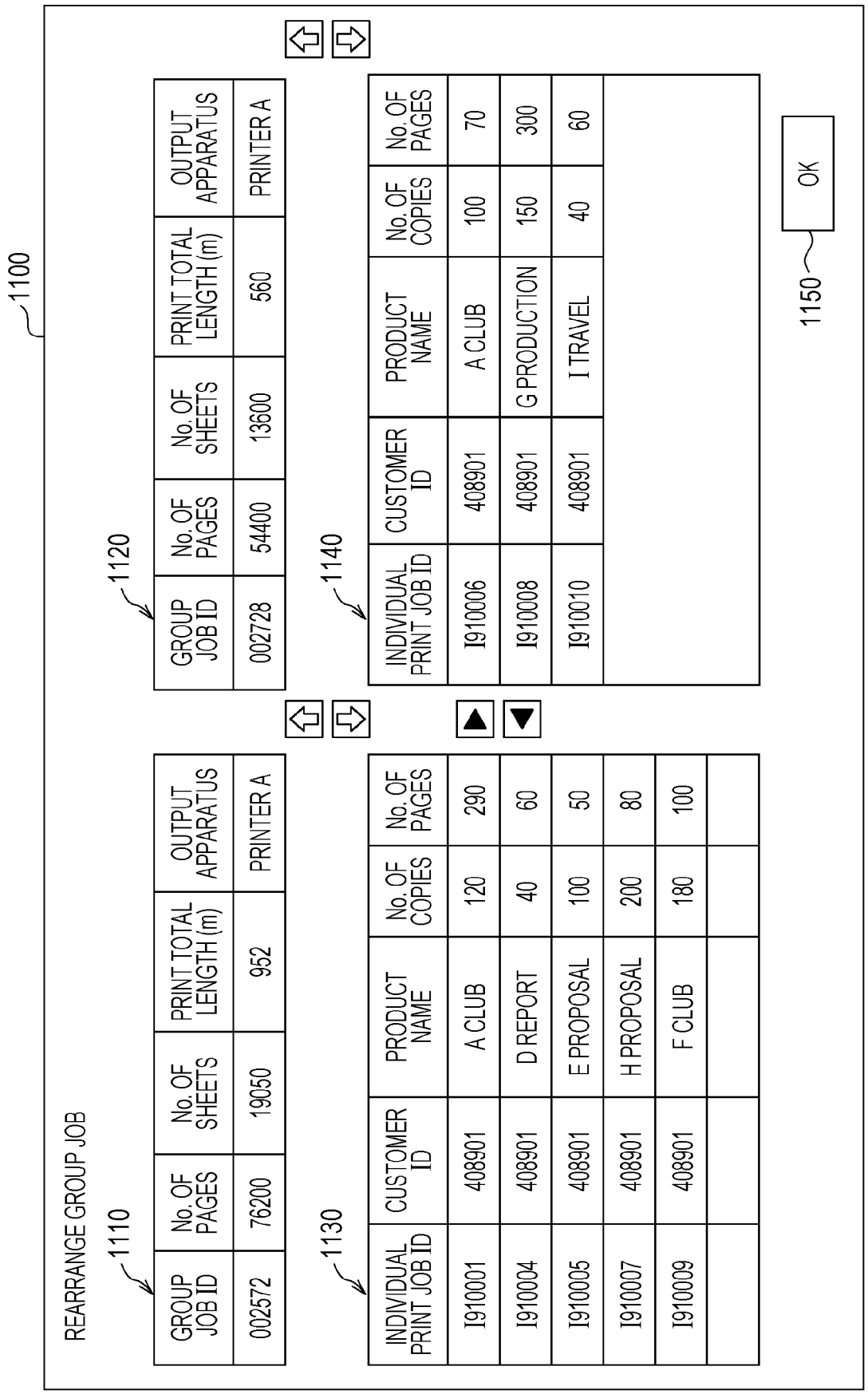
FIG. 11 is a diagram illustrating an example of a rearrangement dialog displayed after rearrangement.

FIG. 11 is a diagram illustrating an example of a rearrangement dialog 1100 displayed after rearrangement. As in FIG. 10, in the rearrangement dialog 1100, individual group jobs included in the first and second group jobs are displayed in a comparative manner. The rearrangement dialog 1100 includes a first group job outline display part 1110, a second group job outline display part 1120, a first individual print job list display part 1130, and a second individual print job list display part 1140.

As can be seen by comparing FIG. 11 with FIG. 10, individual print jobs (individual print jobs having individual print job IDs "I910007" and "I910009", specifically) originally belonging to the second group job have moved to the first group job and are displayed at a bottom of the first individual print job list display part 1130. As a result of the rearrangement of the first and second group jobs, "No. of pages", "No. of sheets", and "print total length" in the first group job outline display part 1110 and the second group job outline display part 1120 have changed.

If the rearrangement of the two group jobs has been completed in step S511, that is, if an "OK" button 1150 in the rearrangement dialog 1100 illustrated in FIG. 11 has been selected, the process returns to step S504. The grouping unit 212 displays the group job list screen 800 illustrated in FIG. 8 on the display 205 using the display control unit 214, and the print job rearrangement unit 215 determines whether the rearrangement has been completed. If the manager selects the "OK" button 860 with one or more group jobs on the group job list screen 800 illustrated in FIG. 8 selected, the print job rearrangement unit 215 determines that the rearrangement of the group jobs has been completed, and the process proceeds to step S505. The print instruction unit 216 outputs individual print jobs included in the selected group jobs to the printer 300 and the bookbinder 400 to perform printing, and the process ends. If the manager selects the "rearrange" button 850 with another group job selected, on the other hand, steps S506 to S511 are performed for the group job until the "OK" button 860 is selected.

The printing process management system 10 according to the present exemplary embodiment has been described. Although individual processing targets are individual print jobs and processing target groups are group jobs in the above exemplary embodiment, the present disclosure is not limited to the above exemplary embodiment. For example, individual processing targets may be individual multimedia files such as music files or movie files and processing target groups may be multimedia file groups, instead.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A management apparatus comprising:
  a storage unit that, if a plurality of individual processing targets are grouped in accordance with predetermined conditions, stores the predetermined conditions and processing target groups generated by grouping the plurality of individual processing targets in accordance with the predetermined conditions while associating the predetermined conditions and the processing target groups with each other; and
  a display control unit that, if one of the processing target groups stored in the storage unit is selected, displays another processing target group that shares at least one of the predetermined conditions with the selected processing target group,
  wherein the display control unit displays the predetermined conditions of the selected processing target group, and
  wherein, if the displayed predetermined conditions are changed, the display control unit displays processing target groups generated using the changed predetermined conditions, wherein, if one of the processing target groups generated using the changed predetermined conditions is selected, the display control unit displays individual processing targets included in the two selected processing target groups in a comparative manner and establishes a state for receiving an instruction to move an individual processing target.

2. The management apparatus according to claim 1, wherein, if a condition is added to the displayed predetermined conditions or one of the displayed predetermined conditions is removed, the display control unit displays processing target groups generated using predetermined conditions after the addition or the removal.

3. The management apparatus according to claim 2, wherein, if one of the processing target groups generated using the predetermined conditions after the addition or the removal is selected, the display control unit displays individual processing targets included in the two selected processing target groups in a comparative manner and establishes a state for receiving an instruction to move an individual processing target.

4. The management apparatus according to claim 1, further comprising:
a grouping unit that generates the processing target groups by grouping the plurality of individual processing targets in accordance with the predetermined conditions.

5. The management apparatus according to claim 2, further comprising:
a grouping unit that generates the processing target groups by grouping the plurality of individual processing targets in accordance with the predetermined conditions.

6. The management apparatus according to claim 3, further comprising:
a grouping unit that generates the processing target groups by grouping the plurality of individual processing targets in accordance with the predetermined conditions.

7. The management apparatus according to claim 1, wherein the plurality of individual processing targets are individual printing units.

8. The management apparatus according to claim 2, wherein the plurality of individual processing targets are individual printing units.

9. The management apparatus according to claim 3, wherein the plurality of individual processing targets are individual printing units.

10. The management apparatus according to claim 4, wherein the plurality of individual processing targets are individual printing units.

11. The management apparatus according to claim 5, wherein the plurality of individual processing targets are individual printing units.

12. A management system comprising:
a storage unit that, if a plurality of individual processing targets are grouped in accordance with predetermined conditions, stores the predetermined conditions and processing target groups generated by grouping the plurality of individual processing targets in accordance with the predetermined conditions while associating the predetermined conditions and the processing target groups with each other; and
a display control unit that, if one of the processing target groups stored in the storage unit is selected, displays another processing target group that shares at least one of the predetermined conditions with the selected processing target group,
wherein the display control unit displays the predetermined conditions of the selected processing target group, and
wherein, if the displayed predetermined conditions are changed, the display control unit displays processing target groups generated using the changed predetermined conditions,
wherein, if one of the processing target groups generated using the changed predetermined conditions is selected, the display control unit displays individual processing targets included in the two selected processing target groups in a comparative manner and establishes a state for receiving an instruction to move an individual processing target.

13. A non-transitory computer readable medium storing a program causing a computer included in a management server to execute a process, the process comprising:
storing, if a plurality of individual processing targets are grouped in accordance with predetermined conditions, the conditions and processing target groups generated by grouping the plurality of individual processing targets in accordance with the predetermined conditions while associating the predetermined conditions and the processing target groups with each other; and
displaying, if one of the processing target groups stored in the storing is selected, another processing target group that shares at least one of the predetermined conditions with the selected processing target group,
the process further comprises:
displaying the predetermined conditions of the selected processing target group;
displaying, if the displayed predetermined conditions are changed, processing target groups generated using the changed predetermined conditions; and
displaying, if one of the processing target groups generated using the changed predetermined conditions is selected, individual processing targets included in the two selected processing target groups in a comparative manner and establishing a state for receiving an instruction to move an individual processing target.

* * * * *